(12) United States Patent
Hagelstrom et al.

(10) Patent No.: US 10,708,295 B1
(45) Date of Patent: Jul. 7, 2020

(54) NETWORK ROUTE HIJACK PROTECTION

(71) Applicant: Architecture Technology Corporation, Eden Prairie, MN (US)

(72) Inventors: Ryan L. Hagelstrom, Chaska, MN (US); Ranga S. Ramanujan, Medina, MN (US); Nathan E. Bahr, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 317 days.

(21) Appl. No.: 15/611,074

(22) Filed: Jun. 1, 2017

Related U.S. Application Data

(60) Provisional application No. 62/344,058, filed on Jun. 1, 2016.

(51) Int. Cl.
| | |
|---|---|
| *H04L 29/06* | (2006.01) |
| *H04L 12/715* | (2013.01) |
| *H04L 12/18* | (2006.01) |
| *H04L 12/46* | (2006.01) |

(52) U.S. Cl.
CPC .......... *H04L 63/1441* (2013.01); *H04L 12/18* (2013.01); *H04L 12/4633* (2013.01); *H04L 45/64* (2013.01); *H04L 63/029* (2013.01); *H04L 63/1433* (2013.01); *H04L 63/0236* (2013.01); *H04L 63/0428* (2013.01)

(58) Field of Classification Search
CPC . H04L 63/1441; H04L 12/18; H04L 12/4633; H04L 45/64; H04L 63/029; H04L 63/1433; H04L 63/0236
See application file for complete search history.

(56) References Cited

U.S. PATENT DOCUMENTS

| | | |
|---|---|---|
| 6,606,706 B1 | 8/2003 | Li |
| 6,870,842 B1 | 3/2005 | Caronni et al. |
| 7,079,495 B1 | 7/2006 | Pearce et al. |
| 7,388,869 B2 | 6/2008 | Butehorn et al. |
| 7,561,570 B2 | 7/2009 | Kondo |
| 8,090,805 B1 | 1/2012 | Chawla et al. |
| 8,434,139 B1 | 4/2013 | Ortiz |
| 9,025,600 B1 | 5/2015 | Vitt et al. |
| 9,641,434 B1 | 5/2017 | Laurence et al. |
| 9,860,169 B1 * | 1/2018 | Ninan ..................... H04L 45/74 |
| 9,998,955 B1 | 6/2018 | MacCarthaigh |
| 10,097,454 B1 | 10/2018 | MacCarthaigh |
| 2002/0138575 A1 | 9/2002 | Hirata |
| 2002/0186694 A1 | 12/2002 | Mahajan et al. |
| 2003/0123453 A1 | 7/2003 | Ooghe et al. |
| 2005/0089050 A1 | 4/2005 | Cheriton |

(Continued)

OTHER PUBLICATIONS

"Filtering Routing Updates on Distance Vector IP Routing Protocols", Cisco, http://www.cisco.com/c/en/us/support/docs/ip/interior-gateway-routing-protocol-igrp/9105-34.html, Aug. 10, 2005, pp. 1-5.

(Continued)

*Primary Examiner* — Ayoub Alata
(74) *Attorney, Agent, or Firm* — Carlson, Caspers, Vandenburgh & Lindquist, P.A.

(57) ABSTRACT

A method of cyber-attack protection is provided. The method includes receiving a unicast packet at a first router and determining whether a destination for the unicast packet is behind a cooperating router. If the destination for the unicast packet is behind a cooperating router, the unicast packet is tunneled from the first router to a tunnel multicast address to which the cooperating router subscribes.

25 Claims, 6 Drawing Sheets

(56) References Cited

U.S. PATENT DOCUMENTS

| | | | |
|---|---|---|---|
| 2008/0062861 A1* | 3/2008 | Shand | H04L 45/02 370/217 |
| 2009/0067330 A1* | 3/2009 | Shand | H04L 45/04 370/235 |
| 2014/0086243 A1 | 3/2014 | Shepherd et al. | |
| 2015/0146603 A1* | 5/2015 | Wu | H04L 12/189 370/312 |
| 2016/0105399 A1 | 4/2016 | Rung et al. | |
| 2016/0127306 A1 | 5/2016 | Wang et al. | |
| 2017/0118176 A1 | 4/2017 | Okhravi et al. | |
| 2019/0014092 A1 | 1/2019 | Malek et al. | |

OTHER PUBLICATIONS

Alaettinoglu, C., "Routing Policy Specification Language (RPSL)" RFC 2622, Network Working Group, Jun. 1999, pp. 1-69, USA.

Blunk, L., "Routing Policy Specification Language next Generation (RPSLng)" RFC 4012, Network Working Group, Mar. 2005, pp. 1-16, USA.

Hedrick, C., "Routing Information Protocol" RFC 1058, Network Working Group, Jun. 1988, pp. 1-29, USA.

Malkin, G., "RIP Version 2 Carrying Additional Information" RFC 1388, Network Working Group, Jan. 1993, pp. 1-7, USA.

Malkin, G., "RIP Version 2 Carrying Additional Information" RFC 1723, Network Working Group, Nov. 1994, pp. 1-9, USA.

Malkin, G., "RIP Version 2" RFC 2453, Network Working Group, Nov. 1998, pp. 1-40, USA.

Malkin, G., "RIPng for IPv6" RFC 2080, Network Working Group, Jan. 1997, pp. 1-19, USA.

Meyer, D., "Using RPSL in Practice" RFC 2650, Network Working Group, Aug. 1999, pp. 1-23, USA.

U.S. Patent and Trademark Office, "Office Action", U.S. Appl. No. 15/611,106, dated Mar. 7, 2019, pp. 1-13.

U.S. Patent and Trademark Office, "Office Action", U.S. Appl. No. 15/611,127, dated Jun. 27, 2019, pp. 1-11.

U.S. Patent and Trademark Office, "Office Action", U.S. Appl. No. 15/611,106, dated Aug. 9, 2019, pp. 1-17.

J.S. Patent and Trademark Office, "Notice of Allowance", U.S. Appl. No. 15/611,106, dated Oct. 17, 2019, pp. 1-8.

U.S. Patent and Trademark Office, "Office Action", U.S. Appl. No. 15/611,127, dated Jan. 8, 2020, pp. 1-7.

* cited by examiner

NETWORK ROUTE HIJACK PROTECTION

RELATED APPLICATIONS

This application claims the benefit of U.S. Provisional Application No. 62/344,058 filed on Jun. 1, 2016, entitled "CYBER HARDENING AND AGILITY TECHNOLOGIES FOR TACTICAL IP NETWORKS", which is hereby incorporated herein by reference.

GOVERNMENT CONTRACTS

This invention was made with government support under contract FA8750-15-C-0254 awarded by the Air Force Research Laboratory (AFRL). The government may have certain rights in the invention.

BACKGROUND

Distance vector routing protocols have been employed in networks for decades. Example distance vector routing protocols include Routing Information Protocol (RIP), Interior Gateway Routing Protocol (IGRP), and Babel. These routing protocols, however, are subject to cyber-attacks involving route hijacking.

Accordingly, there is a need in the art to address the threat of cyber-attacks implemented by hijacking routes in distance vector routing protocols.

BRIEF DESCRIPTION

Embodiments for a method of cyber-attack protection are provided. The method includes receiving a unicast packet at a first router and determining whether a destination for the unicast packet is behind a cooperating router. If the destination for the unicast packet is behind a cooperating router, the unicast packet is tunneled from the first router to a tunnel multicast address to which the cooperating router subscribes.

Embodiments for a processor readable medium are also provided. The processor readable medium includes instructions stored thereon. The instructions, when executed by one or more processing devices, cause the one or more processing devices to configure a data plane of a first router to receive a unicast packet and determine whether a destination for the unicast packet is behind a cooperating router. The instructions also configure the data plane to tunnel the unicast packet from the first router to a tunnel multicast address to which the cooperating router subscribes, if the destination for the unicast packet is behind a cooperating router.

Embodiments for a controller for a data plane of a first router are also provided. The controller includes one or more processing devices, and a data storage medium coupled to the one or more processing devices. The data storage medium has instructions stored thereon. The instructions, when executed by the one or more processing devices, cause the one or more processing devices to configure the data plane of the first router to receive a unicast packet, and determine whether a destination for the unicast packet is behind a cooperating router. The instructions also configure the data plane to tunnel the unicast packet from the first router to a tunnel multicast address to which the cooperating router subscribes, if the destination for the unicast packet is behind a cooperating router.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
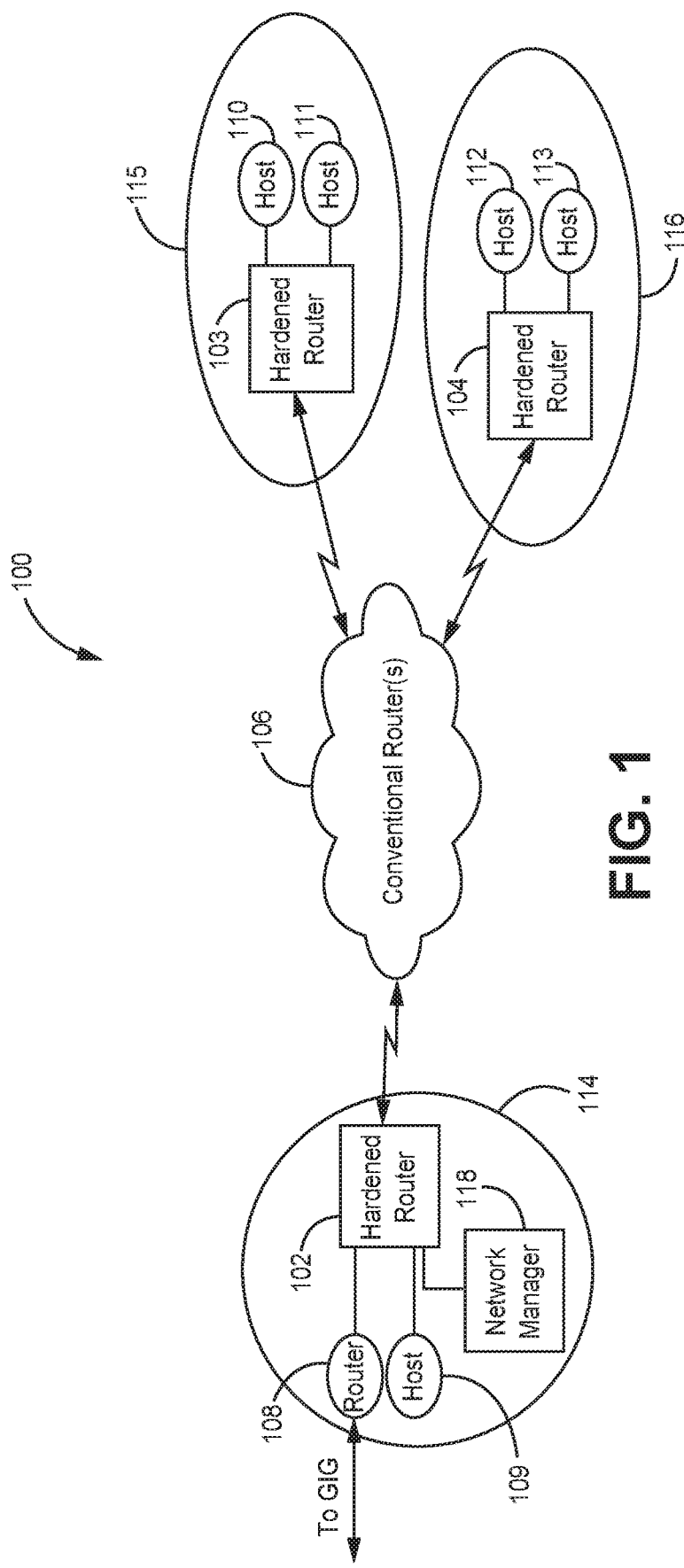
FIG. 1 is a block diagram of an example network including a plurality of hardened routers that address the threat of cyber-attack via route hijacking in distance vector routing protocols.

FIG. 1 is a block diagram of an example network 100 including one or more hardened routers 102-104 that address the threat of cyber-attack via route hijacking in distance vector routing protocols. Along with the one or more hardened routers 102-104, one or more conventional routers, shown as cloud 106, can also be included in network 100. The one or more hardened routers 102-104 and one or more conventional routers 106 are communicatively coupled together through wired and/or wireless network links, such that Internet Protocol (IP) packets can be routed across the network 100.

One or more hosts 108-113 can be communicatively coupled to each hardened router 102-104 via a respective wired or wireless network link. Each hardened router 102-104, therefore, routes packets between destinations in and beyond network 100 to and from the hosts 108-113 in the LAN of that router 102-104. Each of the plurality of hosts 108-113 is in a common local area network (LAN) with its corresponding hardened router 102-104. In this example, host 108 and host 109 are in a first LAN 114 with router 102, host 110 and host 111 are in a second LAN 115 with router 103, and host 112 and host 113 are in a third LAN 116 with router 104. Although two hosts 108-113 are shown in each LAN 114-116. It should be understood that any number of hosts can be in each LAN 114-116, including one host or more than two hosts.

The conventional routers 106 operate outside of each LAN 114-116. From the perspective of the conventional routers 106, hosts 108-113 are communicatively coupled "behind" a corresponding hardened router 102-104. Each hardened router 102-104 provides a barrier between the hosts 108-113 behind the hardened router 102-104 and the cloud of conventional routers 106 and any other devices in the cloud 106. In the example of FIG. 1, host 108 and host 109 are behind hardened router 102, host 110 and host 111 are behind hardened router 103, and host 112 and host 113 are behind hardened router 104.

The routers 102-104 perform Layer 3 Internet Protocol (IP) routing to route packets to and from their respective hosts 108-113, forwarding packets between their respective hosts and other entities in the network 100. Each host 108-113 can comprise any entity capable of communicating IP packets with the hardened routers 102-104. An example host 108-113 includes a personal computer (e.g., laptop, desktop, tablet), a smart phone, a radio over IP (RoIP)

device, voice over IP (VoIP) telephone, network peripheral device (e.g., printer), and a networking device (e.g., router, switch, hub).

The hardened routers 102-104 and conventional routers 106 operate in coordination to route packets through the network 100 in accordance with a common distance vector routing protocol. In an example, the distance vector routing protocol is one of RIP (complying with at least one of Internet Engineering Task Force (IETF) Request for Comment (RFC) 1058, RFC 1723, and RFC 2080), IGRP, EIGRP, or Babel.

Each router 102-104, 106 can be a standalone routing device or can be integrated into another device, such as a communication radio. Each router 102-104 includes a data plane that implements forwarding rules to route packets. The data plane of each router 102-104, 106 is configured by a controller, which is part of the control plane of the router 102-104, 106. The controller can be integrated into a common device (e.g., router 102) with the data plane, as in a traditional router, or can be implemented in a device distinct from the data plane, as in software defined networking (SDN).

A network manager 118 can communicate management plane control messages to the controller(s) 204 for hardened routers 102-104. The control messages from the network manager 118 can control the controller(s) 204 to enable centralized control over the hardened routers 102-104 in the network 100. In an example, the network manager 118 can be communicatively coupled to the network 100, for example, behind a hardened router 102, and can send the management plane control messages to the hardened routers 102-104 as network packets. The management plane control messages can take any suitable form including, but not limited to, simple network management protocol (SNMP) messages.

Figure 2:
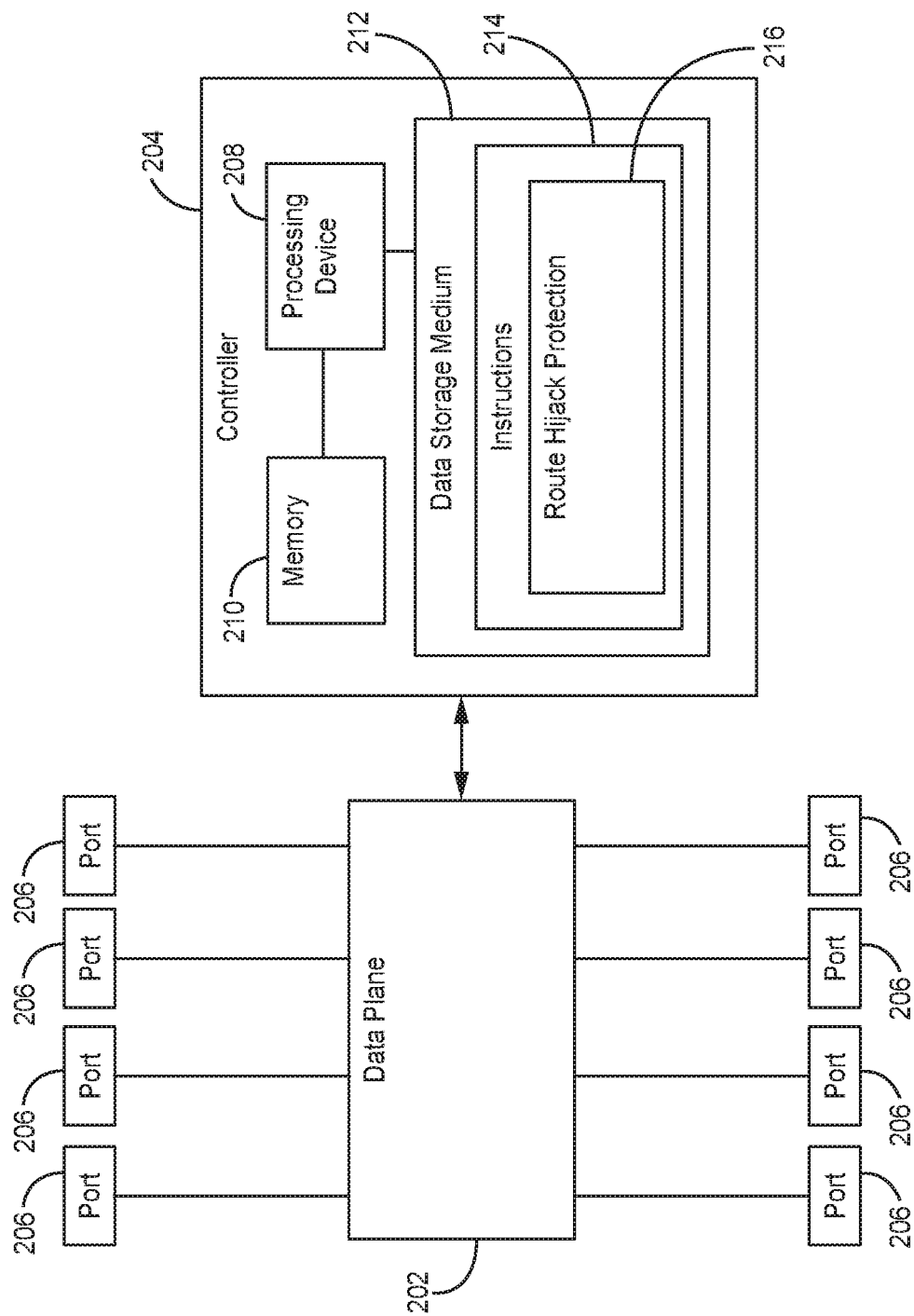
FIG. 2 is a block diagram of an example data plane and controller for a hardened router of FIG. 1.

FIG. 2 is a block diagram of an example data plane 202 and controller 204 for a hardened router 102-104. As mentioned above, the data plane 202 implements the forwarding rules provided by the controller 204 to forward packets between a plurality of hardware ports 206. The data plane 202 can be a hardware matrix, or can be software implemented as in a virtual router.

The controller 204 includes one or more processing devices 208 coupled to memory 210. The one or more processing devices 208 can include any one or more of a general-purpose processor (e.g., a central processing unit (CPU)) and a special-purpose processor (e.g., a digital signal processor (DSP) or graphics processing unit (GPU)). Memory 210 can include any suitable form of random access memory (RAM) now known or later developed, such as dynamic random access memory (DRAM), as well as other types of memory. The controller 204 also includes one or more data storage mediums 212 coupled to the one or more processing devices 208. The one or more data storage mediums 212 can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM. The controller 204 includes instructions 214 stored or otherwise embodied on its respective one or more data storage mediums 212. The instructions 214, when executed by the one or more processing devices 208 of the node controller 204, cause the controller 204 to perform the actions coded in the instructions 214.

The instructions 214 on the controller 204 include instructions 216 to configure the data plane 202 to forward packets according to the routing protocol implemented by the controller 204. In examples where the controller 204 is disposed on a common device with the data plane 202, the controller 204 can configure the data plane directly. In examples where the controller 204 is disposed on a distinct device from the data plane 202, the controller 204 can communicate configuration commands to a client module on the router that includes the data plane 202. The client module on the router can then configure the data plane in accordance with the configuration commands. The configuration commands can be sent as network messages from the controller 204 to the client module on the router. A single controller 204 can control a single data plane 202 or a single controller 204 can control (i.e., configure) multiple data planes 202 (i.e., multiple routers).

The controller 204 can provide cyber-attack protection on the router 102-104 by configuring the data plane to reduce the ability to hijack routes implemented using distance vector routing protocols. A route implemented by a distance vector routing protocol can be hijacked by a malicious host 108 that injects a falsified route into the routing tables of the routers 102-104, 106 of the network 100.

Figure 3:
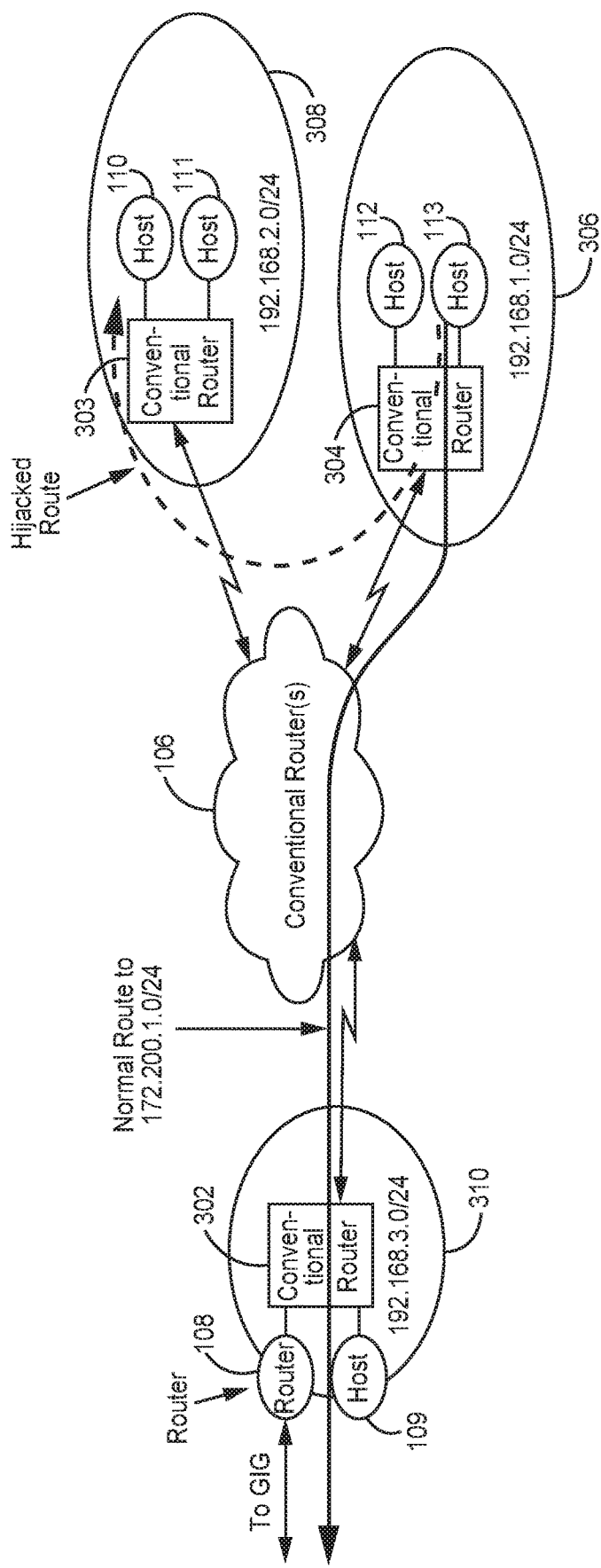
FIG. 3 is a block diagram of an example network in which a route hijacking is occurring.

FIG. 3 is an example network 300 in which a route has been hijacked. Network 300 includes a plurality of conventional (non-hardened) routers 302-304, 106 communicatively coupled together. Network 300 is similar to network 100 except the plurality of hosts 108-113 are disposed behind a conventional router 302-304 instead of a hardened router 102-104. A valid route exists between host 113 and a destination behind router 302. In this example, the (local area network) LAN 306 immediately behind router 304 has a subnet address of 192.168.1.0/24, the LAN 308 immediately behind router 303 has a subnet address of 192.168.2.0/24, and the LAN 310 immediately behind router 302 has a subnet address of 192.168.3.0/24. Host 108 in LAN 310 is a router that serves as the gateway to a wide area network (e.g., the global information grid (GIG)) and provides a default route to all packets destined to the GIG from LANs 306 and 308.

To establish a route to the GIG through host 108 using a distance vector routing protocol, host 108 sends a routing protocol packet to the router 302 advertising reachability of the GIG through host 108. This routing protocol packet includes the source IP address of the message (in this case the host 108), the IP address of the advertised destination (in this case 172.200.1.0/24 which is the IP address for the GIG), as well as one or more metrics describing the source's connection to the advertised destination. The metrics can include the number of router hops between the source and the advertised destination.

Router 302 receives the routing protocol packet and updates its routing table with the information in the message. After updating its routing table, router 302 sends out its own routing protocol packet advertising reachability of the GIG through router 302. The metric information in the routing protocol packet for the route to the GIG is updated with respect to the routing protocol packet sent by host 108 to reflect the additional distance (i.e., 1 hop) that router 302 is away from GIG as compared to host 108. The routing protocol packet sent by router 302 is received by neighboring routers 106 in the network 100, which then update their routing tables accordingly. The neighboring routers then send out respective routing protocol packets to their neighbor routers in the same manner. This process continues to propagate the route to the GIG destination to routers 303 and 304. In this case, the route through host 108 is the best route to the GIG for router 304, so router 304 will forward packets destined for the GIG toward host 108 once its routing table is updated with the information received from its neighboring router(s) 106 regarding the GIG destination. Accordingly, packets sent from host 113 having a destination in the GIG are received by router 304 and sent by router 304 toward router 302 and host 108.

If multiple entries for a single destination are included in a routing table at a router 302-304, 106, the router sends a packet for that destination along the route having the best metrics (e.g., the shortest route). A malicious host 110 can exploit this to hijack the route to a destination. For example, malicious host 110 can send out a falsified routing protocol packet advertising reachability to the GIG. This falsified message is received by router 303, which updates its routing table with the information and sends out its own routing protocol packet to neighboring routers 106. The information from the falsified message can be propagated through the network 100 in the same manner as for messages with legitimate information. In addition to falsely advertising that the GIG can be reached through the host 110, the falsified message can include excellent metrics for its connection. The excellent metrics make it more likely that a router 302-304, 106 receiving the falsified information will choose the route through host 110 to the GIG. In this example, router 304 updates its routing table with the falsified information, and the falsified information shows a better route to the GIG than through host 108. Accordingly, packets from host 113 destined for the GIG are now sent by router 304 toward router 303 and host 110. Host 110, upon receiving the packets from host 113, can simply drop the packets resulting in a loss of connectively for host 113, can snoop on the packets and forward them on toward host 302 and host 108, or can masquerade as the destination server. Unfortunately, host 113 and router 304 may be unaware of the hijack.

One possible way to defend against such route hijacking would be to stop using the distance vector routing protocol in the network 100. Switching the routing protocol in the network 100, however, would involve significant cost and time to update and/or replace the routers 106. Moreover, some of the routers 106 may not be under the control of the entity desiring to make the change.

The methods described herein provide a means to reduce the possibility of a route being hijacked in the manner described above, while still allowing the distance vector protocol to be used to route packets through the network 100. In particular, a plurality of edge routers 102-104 in the network 100 can cooperate to provide protection against route hijacking for hosts behind those routers 102-104. The routers 102-104 are referred to as "edge" routers because the routers 102-104 are at the edge of the routing space defined by conventional routers 106. A router 102-104 having a configuration to cooperate with other correspondingly configured routers 102-104 to provide this protection is referred to herein as a "cooperating router" or a "hardened router".

The controller 204 (i.e., via instructions 216) for each hardened router 102-104 can configure its corresponding hardened router 102-104 to discover and cooperate with other hardened routers 102-104 to provide route hijacking protection for hosts 108-113 behind the respective router 102-104. To provide this protection, each hardened router 102-104 can identify unicast (e.g., unicast transmission control protocol (TCP)) packets having a route through a neighboring hardened router 102-104 and can route the unicast packet toward the neighboring hardened router 102-104 using an overlay routing protocol to provide protection from the route hijacking described above.

The overlay routing protocol is a routing protocol implemented by the hardened routers 102-104 that operates on top of the distance vector routing protocol to route packets between the hardened routers 102-104 in a manner that is transparent to conventional routers 106 that do not use the overlay routing protocol. Thus, the conventional routers 106 can route packets sent using the overlay routing protocol, in a manner consistent with the distance vector routing protocol. The packets formatted according to the overlay routing protocol are configured such that they will be routed by the conventional routers 106 to the desired neighboring hardened router 102-104. Thus, the hardened routers 102-104 can be communicatively coupled at the edges of a routing space implemented by the conventional routers 106 and can route packets across the cloud of conventional routers 106 using the overlay routing protocol. Advantageously, such an overlay routing protocol does not require updating or replacing the routing protocol used by the conventional routers 106. As used herein two hardened routers 102-104 are considered "neighbors" if both hardened routers operate in a common routing space (e.g., the routing space implemented by routers 106).

Figure 4:
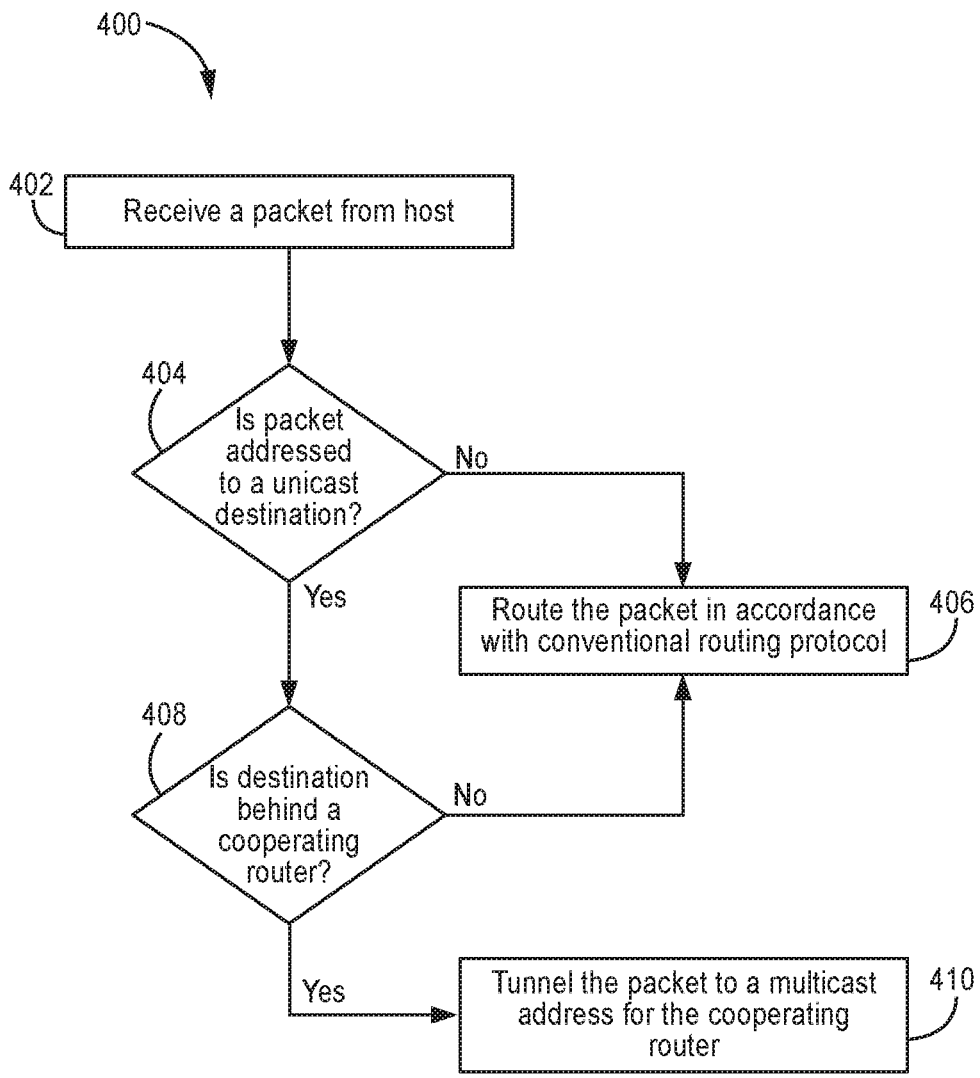
FIG. 4 is a flow diagram of a method of route hijack protection.

FIG. 4 is a flow diagram of an example method 400 of routing a packet using the overlay routing protocol. A hardened router 102-104 can implement method 400 on a received packet prior to implementing the conventional distance vector routing protocol to route the packet. A hardened router 102-104 can receive a packet from a host 108-113 (block 402). The hardened router 102-104 can determine whether the packet is a unicast packet by identifying the destination IP address in the packet as a unicast address or another type of address (e.g., multicast or broadcast) (block 404). To determine whether the address is a unicast address, the hardened router can determine if the address falls within the one or more ranges allocated to unicast addresses in network 100.

If the destination IP address is not a unicast address, the hardened router 102-104 can route the packet in accordance with the conventional distance vector routing protocol (block 406). If the destination IP address is a unicast address, the hardened router 102-104 can determine whether the unicast address is for a destination behind a neighboring hardened router 102-104 (block 408). To determine whether the unicast address is behind a neighboring hardened router 102-104, the neighboring hardened routers 102-104 can exchange reachability information with each other. The reachability information for a given hardened router 102-104 indicates the unicast address(es) that are reachable behind that hardened router 102-104. Each hardened router 102-104 can generate this reachability information and send the reachability information to its neighboring hardened routers 102-104. The hardened routers 102-104 receive the reachability information from each of their neighbors and can maintain a table associating a given neighboring hardened router with the address reachable behind that neighboring hardened router 102-104.

Using this table, in response to receiving a packet with a destination IP address that is a unicast address, a hardened router 102-104 can reference the table to determine if that unicast address is behind any neighboring hardened routers 102-104. If the unicast address is for a destination that is not behind a neighboring hardened router 102-104, the hardened router 102-104 can route the packet in accordance with the conventional distance vector routing protocol (block 406). If the unicast address is for a destination that is behind a neighboring hardened router 102-104, the hardened router 102-104 can tunnel the unicast packet to a multicast address subscribed to by the neighboring hardened router 102-104 (block 410).

To tunnel the unicast packet to the multicast address, the unicast packet is encapsulated to form an encapsulated packet, wherein the destination IP address of the encapsulated packet is the multicast address. In an example, an authentication code (e.g., a message authentication code) can be added to the encapsulated packet to enable the receiving hardened router 102-104 to authenticate the packet. The encapsulated packet can then be sent by the hardened router 102-104 into the cloud of conventional routers 106. The conventional routers 106 will route the packet to any device subscribing to the multicast address of the encapsulated packet. Since the (desired) neighboring hardened router 102-104 subscribes to that multicast address, the conventional routers 106 will route the encapsulated packet to that neighboring hardened router 102-104.

Advantageously, the multicast address cannot be hijacked in the manner described above, because additional entries in the routing table for a given multicast addresses cannot supplant other entries. In contrast, multicast messages are routed to all devices subscribing to that multicast address.

The neighboring hardened router 102-104 receiving the encapsulated packet can decapsulate the encapsulated packet to form a decapsulated packet (e.g., back to the unicast packet). In an example, the neighboring hardened router 102-104 router can authenticate the packet by checking the authentication code added by the sending hardened router 102-104. If the packet authentication fails, the packet is discarded. If the packet authentication is successful, the receiving hardened router 102-104 can continue processing the packet.

Once decapsulated, the neighboring hardened router 102-104 can then route the decapsulated packet toward its destination in any appropriate manner. In an example, the decapsulated packet can be routed to its destination using the overlay routing protocol, to re-encapsulate the decapsulated packet and tunnel the re-encapsulated packet to a hardened router neighboring the neighboring hardened router. In such a manner, the overlay routing protocol can be used to route a unicast packet across an overlay network of hardened routers. A respective routing space of conventional routers can be disposed between each set of neighboring hardened routers. In another example, the decapsulated packet can be routed to the host 108-113 corresponding to the destination IP address in the packet.

To enable the routing to the multicast addresses, each hardened router 102-104 can subscribe to a distinct multicast address. As known, a plurality of IP address in a routing space can be assigned as multicast addresses by the routers 106 implemented by the routing space. Accordingly, to subscribe to a multicast address, a hardened router 102-104 selects an unused IP address from the plurality of IP addresses assigned as multicast addresses, and subscribes to that IP address using the multicast protocol implemented by the routers 106.

A set of neighboring hardened routers 102-104 can communicate with each other so that each hardened router 102-104 in the set can learn the multicast addresses subscribed to by its neighboring hardened routers 102-104. Each hardened router 102-104 can then create an overlay routing table with the multicast addresses. In particular, each entry in the overlay routing table can associate the unicast IP address for a hardened router 102-104 with the multicast address subscribed to by that hardened router 102-104. In an example, each hardened router 102-104 subscribes to a single multicast address for tunneling of packets from a set of neighbors. Moreover, each hardened router 102-104 can subscribe to a distinct multicast address for tunneling than other hardened routers 102-104 in the set of neighbors. In this way, each multicast address for tunneling (also referred to herein as the "tunnel multicast address") acts as a distinct address for the hardened router 102-104, but the tunnel multicast address is still a multicast address by virtue of its assignment as such in the routing space implemented by the conventional routers 106. Once a hardener router 102-104 knows the tunnel multicast address of its neighboring hardened routers 102-104, the hardened router 102-104 can tunnel packets to the neighboring hardened router 102-104 in the manner described above.

In an example, all unicast packets received by a hardened router 102-104 progress through method 400. That is, all unicast packets having a route through a neighboring hardened router 102-104 are tunneled to the tunnel multicast address subscribed to by that neighboring hardened router 102-104. In some examples, method 400 can be selectively performed on a per-port basis in a hardened router 102-104. That is, method 400 is performed for all packets received a first subset of ports of the hardened router 102-104, but method 400 is not performed for packets received at ports of the hardened router 102-104 that are not in the first subset. Alternatively, method 400 can be performed for all packets received on all ports.

Referring back to FIG. 1, for a unicast packet from host 113 having a destination IP address corresponding to the GIG, which is reachable through host (router) 108, the host 113 sends the unicast packet to the hardened router 104. Hardened router 104, following method 400, identifying the unicast packet as a unicast packet having a route through the neighboring hardened router 102. Hardened router 104 then encapsulates the unicast packet and includes as the destination IP address of the encapsulated packet, the multicast address from the entry of its overlay routing table that corresponds to hardened router 102. The hardened router 104 then sends the encapsulated packet into the cloud of conventional routers 106. The conventional routers 106 route the packet in accordance with the distance vector routing protocol to all devices subscribing to that multicast address. Those devices include (and will likely only be) the hardened router 102. Upon receiving the encapsulated packet from the conventional routers 106, the hardened router 102 decapsulates the packet and sends the decapsulated packet to the host 108.

The hardened routers 102-104, in accordance with the overlay routing protocol, can use any appropriate encapsulation scheme for tunneling of the packets to neighboring hardened routers 102-104. In an example, the packets can be encapsulated in accordance with the Minimum Encapsulation (ME) of IP standard defined in the Network Working Group Request for Comments 2004, which is hereby incorporated herein by reference. In another example, the packets can be encapsulated in accordance with the modified Minimal Encapsulation (ME) tunneling protocol described in co-pending U.S. patent application Ser. No. 15/425,364, filed on Feb. 6, 2017, entitled "Low-Overhead Routing", which is hereby incorporated herein by reference. The modified ME tunneling protocol uses the Minimum Encapsulation of IP standard for one or more initial packets and sends subsequent packets using a cut-through routing technique.

A hardened router 102-104 can discover neighboring hardened routers 102-104 by subscribing to a discovery multicast address in the routing space of the conventional routers 106. The discovery multicast address is a multicast IP address that is pre-configured to be used by all hardened routers 102-104 in the set of neighbors. The discovery multicast address is distinct from all the tunnel multicast addresses of the hardened routers 102-104. Each hardened router 102-104 in the set of neighbors sends out a respective hello message to the discovery multicast address. Each hello message, along with identifying the hardened router 102-104 sending the hello message, includes the tunnel multicast address of the hardened router 102-104 sending the hello message. A hardened router 102-104 subscribing to the discovery multicast address can receive each hello message and update the overlay routing table maintained by the hardened router 102-104 to include entries for each of the neighboring hardened modules 102-104. In an example, each hardened router 102-104 sends a hello message periodically. A new hardened router 102-104 can also send its own hello message with its own tunnel multicast IP address to the discovery multicast address. The neighbor hardened routers 102-104, which also subscribe to the discovery multicast address, will receive the hello message and update their overlay routing tables with an entry for the new hardened router 102-104.

By sending and receiving hello message on the discovery multicast address, each hardened router 102-104 in the set of neighboring hardened routers can keep its overlay routing table up-to-date. In an example, if hardened router 102-104 does not receive a hello message from a neighboring hardened router 102-104 having an existing entry in the overlay routing table for a threshold length of time, the hardened router 102-104 will remove the entry for that neighboring hardened router 102-104 from its overlay routing table. In an example, the threshold length of time is a threshold number (e.g., 3) of hello message periods (period between hello messages).

The network manager 118 can authenticate and assign the tunnel multicast addresses to each hardened router 102-104, among other actions. The network manager 118 can be implemented via set of instructions on any appropriate computing device, such as the controller 204 shown in FIG. 2.

In an example, the hardened routers 102-104 can encrypt the unicast packets during encapsulation, such that the data field of the unicast packet or the entire unicast packet is encrypted inside the encapsulated. This encryption can protect information in the unicast packet from a malicious device subscribing to the multicast address of the neighboring hardened router 102-104 to which the unicast packet is tunneled. The neighboring hardened router 102-104 and/or a subsequent hardened route in the overlay route of the packet can decrypt the packet. Appropriate encryption keys can be coordinated in any appropriate manner including by the network manager 118 assigning keys to the hardened routers 102-104.

One or more devices can be included between a host 108-113 and the hardened router 102-104 which the host 108-113 is behind, such as a network switch, bridge, hub, and/or inline network encryptor (INE). Additionally, one or more devices can be included between a hardened router 102-104 and the conventional routers 106 and/or between respective conventional routers 106, such as an INE or a radio which generates a link communicatively coupling the hardened router 102-104 to the conventional routers 106.

Advantageously, by using the method 400 described herein, the hardened routers 102-104 can protect from the route hijacking described above for hosts 108-113 behind a hardened router 102-104. Moreover, the hardened routers 102-104 can implement the protection while maintaining compatibility with conventional routers 106 on one side and conventional hosts 108-113 on the other side. Neither the routers 106 nor the hosts 108-113 need to be updated.

In an example, the network manager 118 can instruct the hardened routers 102-104 to override the method 400 for a certain destination IP address, such that the hardened routers 102-104 route unicast packets having that destination IP address using the conventional distance vector routing protocol and do not tunnel the packet to a neighboring hardened router 102-104 even if there is a route through the neighboring hardened router 102-104 to the destination. The network manager 118 may override the method 400, for example, if the route to the destination IP address that is not through the neighboring hardened router 102-104 is verified or otherwise known to be valid and is better than the route through the neighboring hardened router 102-104.

Figure 5:
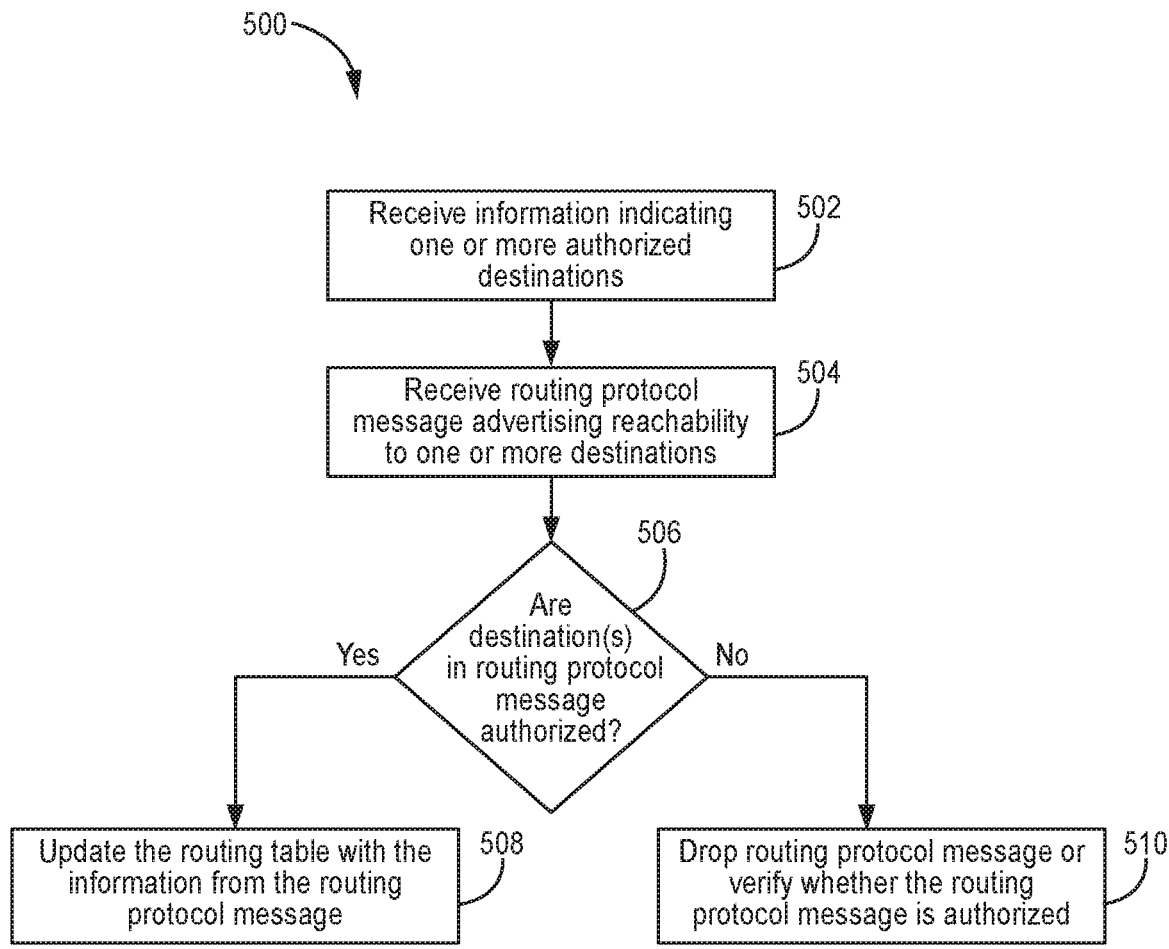
FIG. 5 is a flow diagram of another method of route hijack protection.

Each hardened router 102-104 can also reduce the ability to hijack a route by maintaining a list of authorized destinations behind the hardened router 102-104 and verifying that destination advertisements in a routing protocol packet received from hosts 108-113 are authorized destinations. FIG. 5 is a flow diagram of an example method 500 for verifying such destination advertisements. Initially, the controller 204 for a hardened router 102-104 can receive information indicating one or more destinations that are authorized to be behind the hardened router 102-104 (block 502). The information indicating the one or more authorized destinations can be input to the controller 204 from a network administrator (a human managing operations of the routers 102-104) via a command line entry, or can be received from a network manager 118 as information in a network message. The information can be received over time to update the list of authorized destinations. Each hardened router 102-104 maintains its own list of authorized destinations based on the information that hardened router 102-104 receives. As each hardened router 102-104 has different hosts 108-113 behind it, each hardened router 102-104 can have different destinations in its list of authorized destinations. Alternatively, a global list of authorized destinations can be provided to each hardened router 102-104 in a neighboring set of hardened routers, such that the authorized destinations can be behind any of the hardened routers 102-104 in the set. In the example network 100 of FIG. 1, the authorized destinations for hardened router 102 include at least host 108 and host 109, the authorized destinations for hardened router 103 includes at least host 110 and host 111, and the authorized destinations for hardened router 104 includes at least host 112 and host 113. The one or more authorized destinations can be one or more IP addresses and/or one or more ranges of IP addresses.

A hardened router 102-104 receiving a routing protocol packet advertising reachability to one or more destinations (block 504), checks the one or more destinations before adding the one or more destinations to the distance vector routing table (i.e., the routing table for the distance vector routing protocol) maintained at the hardened router 102-104. To check the one or more destinations, the one or more destinations advertised in the routing protocol packet are compared to the authorized destinations of the hardened router 102-104 (block 506).

Figure 6:
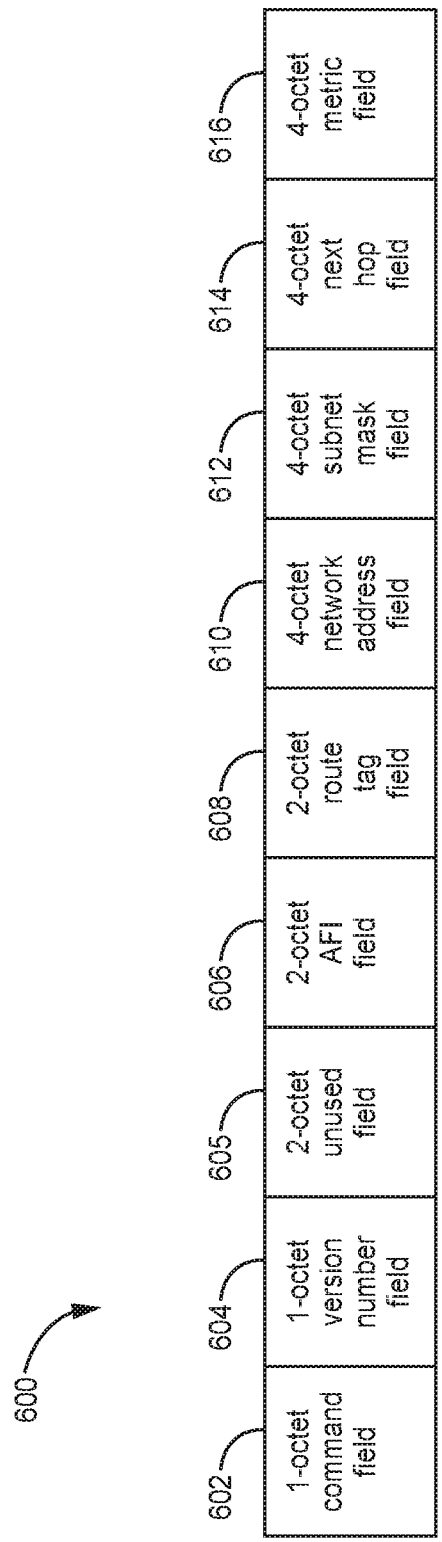
FIG. 6 is a block diagram of an example route protocol packet used in the method of FIG. 5.

FIG. 6 is a diagram of an example IP routing protocol packet 600 conforming with the routing information protocol (RIP) 2 format defined in IETF RFC 1723, which is hereby incorporated herein by reference. As shown the IP routing protocol packet includes a command field 602, a version field 604, an unused field 605, an AFI field 606, a route tag field 608, a network address field 610 a subnet mask field 612, a next hop field 614, and a metric field 616. The command field 602 includes information indicating whether the packet is a request or a response. A request asks for destinations reachable from a router receiving the request, while a response (also known as just a regular RIP 2 packet) includes one or more IP addresses which the sender of the response is advertising as reachable through the sender. The version field 604 includes the version of RIP used. The AFI field 606 includes the address family used. The route tag field 608 includes information to identify whether the route is internal or external.

The network address field 610 includes an IP address advertised as reachable by the sender of a response, and the subnet mask field 612 includes a subnet mask for the IP address in the network address field 610. The next hop field 614 includes the IP address of the next hop to which packets sent toward the IP address in the network address field 614 should be forwarded. The metric field 616 includes the number of internetwork hops (routers) that have been traversed from the IP address in the network address field 610. Up to 25 occurrences of the set of fields: an AFI field 606, a route tag field 608, a network address field 610 a subnet mask field 612, a next hop field 614, and a metric field 616, can be included in a single RIP 2 packet.

For such a RIP 2 packet, the destination advertised is the IP address in the network address field 610. Accordingly, the hardened router 102-104 compares the IP address in each network address field 610 of the RIP 2 packet with the authorized destination(s). If all of the one or more destinations in the routing protocol packet are authorized destinations of the hardened router 102-104, the distance vector routing table is updated with the information in the routing protocol packet (block 508). This update can occur in the normal manner, complying with the distance vector routing protocol.

If one or more of the destinations in the routing protocol packet are not authorized destinations for the hardened router 102-104, the hardened router 102 can, in one example, drop the routing protocol packet without updating the distance vector routing table with the information from the routing protocol packet or, in another example, verify with the network manager 118 whether the routing protocol packet is authorized (block 510). Either of these actions provide route hijacking protection, because unauthorized destination advertisements are either dropped or are verified, and therefore falsified routes cannot be propagated through the network from hosts 108-113 behind a hardened router 102-104. The hardened router 102-104 can also log that an unauthorized routing protocol packet was received and include information (e.g., the source, advertised destination(s)) from the packet.

In an example, the checking of the one or more destinations advertised in a routing protocol packet against the authorized destinations is performed for routing protocol packets received at only a subset of the hardware ports 206 for the hardened router 102-104. For example, the hardened router 102-104 can check one or more destinations in any routing protocol packets received at all ports that are predetermined to face the hosts 108-113, but not check one or more destinations in any routing protocol packets received at one or more ports predetermined to face the cloud of conventional routers 106. A port is considered to "face" a device or devices if packets sent from the device or devices are received at that port. The controller 204 for the hardened router 102-104 can receive information (e.g., from a network administrator or the network manager 118) identifying which one or more ports an authorized address or addresses correspond to. The controller 204 can keep track of which ports a list of authorized addresses correspond to and check the routing protocol packets received at those ports. In an example, the one or more ports that are not checked against the authorized destinations, can be set to have all destinations authorized or can be set such that the routing protocol packets from those ports are acted in accordance with the distance vector routing protocol and do not proceed through method 500. In some examples, different lists of authorized destinations can be maintained for different ports 206, and the authorized destinations can correspond to ports on up to a one-to-one basis. For example, a first list of authorized destinations can be maintained for a first subset of ports, a second list of authorized destinations can be maintained for a second subset of ports, and all destinations can be authorized for a third subset of ports. The controller 204 can continue to receive information regarding authorized destinations and corresponding ports to add and remove destinations from the authorized destinations and corresponding ports over time. All routing protocol packets received at a port having corresponding authorized destinations can be checked as described in method 500.

To verify a routing protocol packet that advertises one or more destinations that are not authorized, the controller 204 of the hardened router 102-104 can send a message to the network manager 118 indicating that a routing protocol packet was received that advertised reachability to one or more unauthorized destinations. The message sent to the network manager 118 can identify the source of the routing protocol packet as well as any other information in the routing protocol packet including any destinations advertised, or at least any unauthorized destinations advertised.

The network manager 118 can receive the message from the controller 204 of the hardened router 102-104 and perform an appropriate action in response. For example, the network manager 118 can alert a network administrator to the routing protocol packet, log the reception of the routing protocol packet, and/or compare the destination(s) advertised in the routing protocol packet to information it has regarding authorized destinations. After performing that action and/or receiving additional input from a network administrator, the network manager 118 can send a response to the controller 204 of the hardened router 102-104, indicating whether or not the routing protocol packet is authorized. If the response indicates that the routing protocol packet is authorized, the controller 204 can update the distance vector routing table with the information in the routing protocol packet. If the response indicates that the routing protocol packet is not authorized, the controller 204 can drop the routing protocol packet without updating the distance vector routing table with the information in the routing protocol packet.

Methods 400 and 500 can be used independently or together at a given hardened router 102-104 to provide route hijacking protection in the manner described above.

What is claimed is:

1. A method of cyber-attack protection, the method comprising:

maintaining an overlay routing table at a first router, the overlay routing table including a respective tunnel multicast address subscribed to by each of a plurality of cooperating routers neighboring the first router;

receiving a unicast packet at the first router, the unicast packet having a destination internet protocol (IP) address in a destination IP address field of an IP header thereof;

determining, at the first router, whether the destination IP address for the unicast packet is behind a cooperating router of the plurality of cooperating routers; and if the destination IP address for the unicast packet is behind the cooperating router, tunneling the unicast packet from the first router to a subscribed tunnel multicast address in the overlay routing table for the cooperating router.

2. The method of claim 1, comprising:

receiving a second unicast packet at the first router, the second unicast packet having a second destination IP address in a destination IP address field of an IP header thereof; and if the second destination IP address is behind any of the plurality of cooperating routers:
- obtaining, from the overlay routing table, a second tunnel multicast address corresponding to the cooperating router that the destination IP address is behind; and
- tunneling the second unicast packet from the first router to the second tunnel multicast address.

3. The method of claim 1, comprising:

receiving a respective hello message at the first router from each of the plurality of cooperating routers neighboring the first router, the respective hello messages including the tunnel multicast address subscribed to by the cooperating router sending the hello message, wherein maintaining the overlay routing table includes updating the overlay routing table to include an entry for each of the plurality of cooperating routers, the entries including the tunnel multicast address in the hello message received from the cooperating router corresponding to that entry.

4. The method of claim 3, wherein the tunnel multicast address in the respective hello messages is dedicated to the cooperating router sending the hello message, such that each of the plurality of cooperating routers does not subscribe to any tunnel multicast address dedicated to another of the plurality of cooperating routers.

5. The method of claim 3, comprising:

the first router subscribing to a discovery multicast address to which all of the plurality of neighboring cooperating routers subscribe, wherein the hello messages are received at the discovery multicast address.

6. The method of claim 1, comprising:

receiving, at the first router, a tunneled packet at a third tunnel multicast address;

decapsulating the tunneled packet to produce a decapsulated packet; and sending the decapsulated packet from the first router toward a destination of the decapsulated packet.

7. The method of claim 6, comprising:

the first router subscribing to the third tunnel multicast address; and sending from the first router a hello message to a discovery multicast address to which all neighboring cooperating routers subscribe, the hello message indicating that the first router subscribes to the third tunnel multicast address.

8. The method of claim 7, comprising:

periodically sending a hello message to the discovery multicast address, the hello messages indicating that the first router subscribes to the third tunnel multicast address.

9. The method of claim 1, wherein a network communicatively coupled between the first router and the cooperating router routes unicast packets with a distance-vector based routing protocol.

10. The method of claim 1, comprising:

receiving information, at the first router, indicating one or more authorized IP addresses, wherein the one or more authorized IP addresses are IP addresses that are authorized to be included in a routing table of the router;

receiving a routing protocol packet advertising reachability to a second one or more IP addresses;

comparing the second one or more IP addresses to the one or more authorized IP addresses; and if any of the second one or more IP addresses are not included in the one or more authorized IP addresses, determining whether to:
- drop the routing protocol packet without updating the routing table with information in the routing protocol packet; or
- verify with a network manager whether the routing protocol packet is authorized.

11. The method of claim 10, wherein in response to a determination to verify with the network manager, sending a message to the network manager indicating that a routing protocol packet was received advertising reachability to one or more IP addresses that were not included in the one or more authorized IP addresses;

receiving a response from the network manager; and if the response indicates the routing protocol packet is authorized, updating the routing table with information in the routing protocol packet; or if the response indicates the routing protocol packet is not authorized, dropping the routing protocol packet without updating the routing table with information in the routing protocol packet.

12. The method of claim 11, wherein sending a message to the network manager includes sending to the network manager the one or more IP addresses of the second one or more IP addresses that are not included in the one or more authorized IP addresses.

13. The method of claim 10, wherein the routing protocol packet is one of a Routing Information Protocol (RIP) packet complying with at least one of IETF RFC 1058, RFC 1723, and RFC 2080, an IGRP packet, an EIGRP packet, or a Babel packet.

14. The method of claim 13, wherein the second one or more IP addresses are addresses in the IP Address field of an RIP packet.

15. The method of claim 1, comprising:

receiving the tunneled packet at the cooperating router;

decapsulating the tunneled packet to produce a decapsulated packet, wherein the decapsulated packet is a unicast packet having the destination IP address in a destination IP address field of an IP header thereof; and sending the decapsulated packet from the cooperating router toward the destination IP address.

16. A non-transitory processor readable medium comprising:

instructions stored thereon, wherein the instructions, when executed by one or more processing devices, cause the one or more processing devices to configure a data plane of a first router to:

maintain an overlay routing table, the overlay routing table including a respective tunnel multicast address subscribed to by each of a plurality of cooperating routers neighboring the first router;

receive a unicast packet, the unicast packet having a destination internet protocol (IP) address in a destination IP address field of an IP header thereof;

determine whether the destination IP address for the unicast packet is behind a cooperating router of the plurality of cooperating routers; and if the destination IP address for the unicast packet is behind the cooperating router, tunnel the unicast packet to a subscribed tunnel multicast address in the overlay routing table for the cooperating router.

17. The non-transitory processor readable medium of claim 16, wherein the instructions cause the one or more processing devices to configure the data plane of the first router to:

receive a second unicast packet at the first router, the second unicast packet having a second destination IP address in a destination IP address field of an IP header thereof; and if the second destination IP address is behind any of the plurality of cooperating routers:

obtain, from the overlay routing table, a second tunnel multicast address corresponding to the cooperating router that the destination IP address is behind; and tunnel the second unicast packet to the second tunnel multicast address.

18. The non-transitory processor readable medium of claim 16, wherein the instructions cause the one or more processing devices to configure the data plane of the first router to:

receive a respective hello message from each of the plurality of cooperating routers neighboring the first router, the respective hello messages including the tunnel multicast address subscribed to by the cooperating router sending the hello message, wherein maintain the overlay routing table includes update the overlay routing table to include an entry for each of the plurality of cooperating routers, the entries including the tunnel multicast address in the hello message received from the cooperating router corresponding to that entry.

19. The non-transitory processor readable medium of claim 18, wherein the tunnel multicast address in the respective hello messages is dedicated to the cooperating router sending the hello message, such that each of the plurality of cooperating routers does not subscribe to any tunnel multicast address dedicated to another of the plurality of cooperating routers.

20. The non-transitory processor readable medium of claim 16, wherein the instructions cause the one or more processing devices to configure the data plane of the first router to:

receive a tunneled packet at a third tunnel multicast address;

decapsulate the tunneled packet to produce a decapsulated packet; and send the decapsulated packet from the first router toward a destination of the decapsulated packet.

21. A controller for a data plane of a first router, the controller comprising:

one or more processing devices;

a data storage medium coupled to the one or more processing devices, the data storage medium having instructions stored thereon, wherein the instructions, when executed by the one or more processing devices, cause the one or more processing devices to configure the data plane of the first router to:

maintain an overlay routing table, the overlay routing table including a respective tunnel multicast address subscribed to by each of the plurality of cooperating routers neighboring the first router;

receive a unicast packet, the unicast packet having a destination internet protocol (IP) address in a destination IP address field of an IP header thereof;

determine whether the destination IP address for the unicast packet is behind a cooperating router of the plurality of cooperating routers; and if the destination IP address for the unicast packet is behind the cooperating router, tunnel the unicast packet to a subscribed tunnel multicast address in the overlay routing table for the cooperating router.

22. The controller of claim 21, wherein the instructions cause the one or more processing devices to configure the data plane of the first router to:

receive a second unicast packet at the first router, the second unicast packet having a second destination IP address in a destination IP address field of an IP header thereof; and if the second destination IP address is behind any of the plurality of cooperating routers:

obtain, from the overlay routing table, a second tunnel multicast address corresponding to the cooperating router that the destination IP address is behind; and tunnel the second unicast packet from the first router to the second tunnel multicast address.

23. The controller of claim 21, wherein the instructions cause the one or more processing devices to configure the data plane of the first router to:

receive a respective hello message from the plurality of cooperating routers neighboring the first router, each of the respective hello messages including the tunnel multicast address subscribed to by the cooperating router sending the hello message, wherein maintain the overlay routing table includes update the overlay routing table to include an entry for each of the plurality of cooperating routers, the entries including the tunnel multicast address in the hello message received from the cooperating router corresponding to that entry.

24. The controller of claim 23, wherein the tunnel multicast address in the respective hello messages is dedicated to the cooperating router sending the hello message, such that each of the plurality of cooperating routers does not subscribe to any tunnel multicast address dedicated to another of the plurality of cooperating routers.

25. The controller of claim 21, wherein the instructions cause the one or more processing devices to configure the data plane of the first router to:

receive a tunneled packet at a third tunnel multicast address;

decapsulate the tunneled packet to produce a decapsulated packet; and send the decapsulated packet from the first router toward a destination of the decapsulated packet.

* * * * *